United States Patent [19]

Nichols

[11] Patent Number: 5,089,165

[45] Date of Patent: * Feb. 18, 1992

[54] COMPOSITIONS OF WATER-DISPERSED DIPRIMARY AMINE TERMINATED POLYMERS

[75] Inventor: Carl S. Nichols, Pineville, N.C.

[73] Assignee: The BFGoodrich Company, Akron, Ohio

[*] Notice: The portion of the term of this patent subsequent to Jan. 29, 2008 has been disclaimed.

[21] Appl. No.: 597,610

[22] Filed: Oct. 15, 1990

Related U.S. Application Data

[63] Continuation of Ser. No. 498,472, Mar. 22, 1990, Pat. No. 4,988,461, which is a continuation of Ser. No. 134,385, Dec. 17, 1987, abandoned.

[51] Int. Cl.$^5$ .................................................. C09K 3/00
[52] U.S. Cl. ........................... 252/182.18; 252/182.29; 252/183.11; 252/183.12; 524/320; 524/376
[58] Field of Search .................... 252/182.18, 182.29, 252/183.12, 183.11; 524/320, 376

[56] References Cited

U.S. PATENT DOCUMENTS

| | | | |
|---|---|---|---|
| 3,155,728 | 10/1960 | Lesesne | 260/584 |
| 3,316,185 | 4/1967 | Reinking | 260/2 |
| 3,436,359 | 4/1969 | Hubin et al. | 260/2 |
| 3,654,370 | 4/1972 | Yeakey | 260/584 |
| 4,018,847 | 4/1977 | Messerly | 260/831 |
| 4,024,105 | 5/1977 | Sextro et al. | 524/381 X |
| 4,055,541 | 10/1977 | Riew | 260/47 |
| 4,058,657 | 11/1977 | Ireland | 526/263 |
| 4,088,708 | 5/1978 | Riew | 259/836 |
| 4,105,518 | 8/1978 | McGinnis | 525/153 X |
| 4,120,768 | 10/1978 | Gibson et al. | 204/181.7 |
| 4,133,957 | 1/1979 | Riew | 544/357 |
| 4,190,564 | 2/1980 | Tominaga et al. | 525/463 X |
| 4,221,885 | 9/1980 | Schimmel et al. | 525/328 |
| 4,251,414 | 2/1981 | Nakada et al. | 525/526 X |
| 4,253,930 | 3/1981 | Tsuchiya et al. | 204/181 |
| 4,260,700 | 4/1981 | Cassutt et al. | 525/113 |
| 4,283,313 | 8/1981 | Omika et al. | 523/404 |
| 4,316,784 | 2/1982 | Buchwalter et al. | 204/181.7 |
| 4,320,047 | 3/1982 | Murphy | 523/457 |
| 4,432,850 | 2/1984 | Moriarity et al. | 204/181.7 |
| 4,507,428 | 3/1985 | Higginbottom et al. | 524/596 |
| 4,521,490 | 6/1985 | Pocius et al. | 428/416 |
| 4,566,962 | 1/1986 | McGinniss | 204/181.7 X |
| 4,677,028 | 6/1987 | Heeringa et al. | 524/376 X |
| 4,851,464 | 7/1989 | Wozniak | 524/376 X |
| 4,882,081 | 11/1989 | Nichols | 252/182.28 |
| 4,988,461 | 1/1991 | Nichols | 252/182.18 |

OTHER PUBLICATIONS

Article by Celanese Specialty Resins entitled "CMD WJ60-8537 Curing Agent".

Primary Examiner—Robert L. Stoll
Assistant Examiner—Gary L. Geist
Attorney, Agent, or Firm—Debra L. Pawl; David P. Dureska; Daniel J. Hudak

[57] ABSTRACT

Novel water-dispersed compositions are prepared containing (1) 100 parts by weight of an amine-containing polymer, (2) at least 25 parts by weight of a solvent which is soluble in both water and organics and has a boiling point above about 100° C., (3) at least about 0.8 equivalent of an organic acid having a pk$_a$ value of less than 5, and (4) from about 50 to about 750 parts by weight of water. The compositions are useful as a component in water-borne resin systems such as epoxies and polyesters.

6 Claims, No Drawings

COMPOSITIONS OF WATER-DISPERSED DIPRIMARY AMINE TERMINATED POLYMERS

CROSS-REFERENCE

This is a continuation of U.S. application Ser. No. 07/498,472, filed Mar. 22, 1990, of Carl Steven Nicols for "COMPOSITION OF WATER-DISPERSED AMINE-CONTAINING POLYMERS," now U.S. Pat. No. 4,988,461 which in turn is a continuation of Ser. No. 134,385, filed Dec. 17, 1987, of Carl Steven Nicols, for "COMPOSITION OF WATER-DISPERSED AMINE-CONTAINING POLYMERS," now abandoned.

BACKGROUND

This invention relates to new compositions of water-dispersed, amine-containing reactive polymers. Polymers of lower molecular weight which contain amine groups are known in the art. For example, U.S. Pat. No. 4,133,957 describes amine-terminated liquid polymers represented by the formula

wherein Y is a univalent radical obtained by removing hydrogen from an amine group of an aliphatic, alicyclic, heterocyclic or aromatic amine containing at least two secondary or mixed primary and secondary amine groups with no more than one primary amine group per molecule, and "B" is a polymeric backbone comprising carbon-carbon linkages. Other amine-containing liquid polymers having carbon-carbon linkage backbones and their uses are described in U.S. Pat. Nos. 4,018,847; 4,055,541; 4,058,657; 4,088,708; 4,221,885; 4,260,700; and 4,320,047. The B. F. Goodrich Company markets a line of amine-containing polymers containing carbon-carbon backbone linkages under the trademark Hycar ® RLP.

Amine-containing polymers are also known which have carbon-oxygen linkages in the polymeric backbones. An example of this type of amine-containing liquid polymer is the polyether polyamines described in U.S. Pat. No. 3,436,359. Other examples of amine-containing liquid polymers having carbon-oxygen backbone linkages backbones and their uses are described in U.S. Pat. Nos. 3,316,185 and 4,521,490. The '490 patent describes its amine-containing polymers as poly(oxyhydrocarbolene)diamines. The Jefferson Chemical Company subsidiary of Texaco, Inc. markets such amine-containing polymers under the Trademark Jeffamine ® polyoxypropyleneamines.

Amine-containing polymers are useful as components in castable elastomeric systems, as tougheners for epoxy and polyester resins in structural plastics, and in paints, coatings, sealants, adhesives, and the like.

The amine-containing polymers have, heretofore, been used primarily in their liquid form or in the form of solvent solutions. However, in many applications such as in paints, coatings, sealants, and adhesives, it would be advantageous to use the polymers in the form of a water-dispersion. A method that can be used to convert amine-containing liquid polymers to water-dispersed compositions involves adding the polymer to a mixture of water and a high level of soap using a high speed mixer such as an Eppenbach homogenizer or a Mini-sonic homogenizer and agitating the mixture under high shear. Such processes require equipment and time to perform, introduce high levels of soap into the final composition, and have not resulted in completely satisfactory water-dispersed compositions.

SUMMARY OF THE INVENTION

Water dispersed, amine-containing polymer compositions are readily prepared which comprise a mixture of:

(1) 100 parts by weight of an amine-containing polymer which has an average molecular weight from about 1000 to about 10,000, (2) at least about 25 parts by weight of an organic solvent which is both water and organic soluble and has a normal boiling point above about 100° C.;

(3) at least about 0.8 carboxyl equivalent of an organic acid for each 1.0 amine equivalent, said acid having a pka value of less than about 5; and (4) from about 50 to about 750 parts of water.

DETAILED DESCRIPTION

Amine-containing polymers which are suitable for use in this invention can be represented by the following general formula:

wherein Y is a univalent radical obtained by removing hydrogen from an amine group of an aliphatic, alicyclic, heterocyclic or aromatic amine which has at least two secondary or mixed primary and secondary amine groups; n is an integer from 1 to about 10; X is either Y or a monomeric unit of the polymeric backbone; and B is a polymeric backbone comprising carbon-carbon or carbon-oxygen linkages. The polymers used in this invention have an average molecular weight of from about 1000 to about 10,000; and can be liquids or low melting solids at ambient or room temperature (about 25° C.). Generally, the polymeric backbone linkages comprise at least about 70% by weight and more typically at least about 90% by weight of the total polymer, and the amine groups comprise from a minimum of about 0.5% to about 10% or more by weight of the total polymer. The polymer can contain pendant amine groups in addition to or in place of terminal amine groups.

Amine-containing polymers such as referenced above are known. Examples of amine-containing liquid polymers having polymeric backbones comprising carbon-carbon linkages are described in U.S. Pat. No. 4,133,957, which description is hereby incorporated by reference. Such polymers are further described in U.S. Pat. No. 4,018,847. These polymers are readily prepared by the reaction of a carboxyl-containing liquid polymer with a diamine or by other methods adequately described in the above-mentioned patents.

Amine-containing polymers having polymeric backbones comprising carbon-oxygen linkages are prepared and described in U.S. Pat. Nos. 3,155,728 and 3,436,359, which descriptions are hereby incorporated by reference. Such polymers are further disclosed in U.S. Pat. Nos. 3,316,185; 3,654,370; and 4,521,490.

The method of preparing the amine-containing polymers is not critical to this invention. Any amine-containing polymers meeting the specification defined herein can be formed into the water-dispersed compositions of the invention using the method described herein.

If the polymers are liquids at room temperature; i.e. about 25° C., the polymers have a Brookfield viscosity (measured using a Brookfield RVT viscometer at 27° C. with spindle No. 7 at about 20 rpm) of from about 200 cps to about 2,500,000 cps, and more preferably from about 500 cps to about 1,000,000 cps. Polymers which are low-melting solids at room temperature, such as those described in U.S. Pat. No. 3,436,359, are also useful in this invention. These polymers are readily heated up to 50° or 60° C. or more to yield a liquid form easily useable in this invention.

The amine-containing polymers can have pendant amine groups (i.e., amine groups which are attached to the polymeric backbone as side groups) and/or terminal amine groups (i.e., amine groups which are attached to the ends of the polymeric backbone). The amine-terminated polymers can be mono-functional; i.e. having a primary or secondary amine group at one terminal end of the molecule, or di-functional; i.e. having a primary and/or secondary amine group at each terminal end of the molecule. Hence, the total amine functionality of the more preferred amine-terminated polymers can range from 1 to about 10 or more, but more preferably ranges from 1 to about 3 amine groups per molecule.

The amine-terminated polymers having carbon-oxygen linkages in the backbone have, for the most part, a much wider range of average molecular weight and viscosity than the amine-terminated liquid polymers having carbon-carbon backbones. For example, the polyglycalamine polymer sold as Jeffamine ® polyoxypropyleneamine D-2000 has an average molecular weight of about 2000, and a viscosity of about 265 centipoises (measured at 25° C. using a Brookfield RVT viscometer with spindle No. 1 at 20 rpm). The polytetramethyleneoxide polymers sold by Minnesota Mining and Manufacturing are low-melting solids at room temperature and have viscosities of up to 100,000 cps at 65° C.

The most preferred amine-containing liquid polymers are the amine-terminated liquid polymers which have polymeric backbones comprised of carbon-carbon linkages derived from polymerized units of at least one vinylidene monomer having at least one terminal $CH_2=$ group. Examples of such vinylidene monomers are (a) monoolefins containing 2 to 14 carbon atoms, more preferably 2 to 8 carbon atoms, such as ethylene, propylene, isobutylene, 1-butene, 1-pentene, 1-hexene, 1-heptene, and the like; (b) dienes containing 4 to 10 carbon atoms, more preferably 4 to 8 carbon atoms, such as butadiene, isoprene (2-methyl-1,3-butadiene), 2-isopropyl-1,3-butadiene, chloroprene (2-chloro-3-butadiene), and the like; (c) vinyl and allyl esters of carboxylic acids containing 2 to 8 carbon atoms such as vinyl acetate, vinyl propionate, allyl acetate, and the like; and (d) vinyl and allyl ethers of alkyl radicals containing 1 to 8 carbon atoms such as vinyl methyl ether, allyl methyl ether, and the like. Often two or more types of these polymerized monomeric units are contained in the polymeric backbone.

The vinylidene monomers described above may be polymerized readily with up to about 50% by weight and more preferably up to about 35% by weight of at least one comonomer selected from the group consisting of (e) vinyl aromatics having the formula

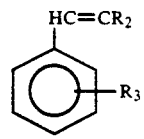

wherein $R_2$ is hydrogen or methyl and $R_3$ is hydrogen, halogen or an alkyl radical containing from 1 to 4 carbon atoms, such as styrene, α-methyl styrene, chlorostyrene, vinyl toluene, and the like; (f) vinyl nitriles having the formula

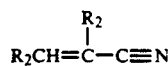

such as acrylonitrile and methacrylonitrile (g) vinyl halides such as vinyl bromide, vinyl chloride, and the like; (h) vinyl acids such as acrylic acid, methacrylic acid, and itaconic acid; (i) divinyls and diacrylates such as divinyl benzene, divinyl ether, diethylene glycol diacrylate, and the like; (j) amines of α,β-olefinically unsaturated carboxylic acids containing 2 to 8 carbon atoms such as acrylamide, and the like; and (k) allyl alcohol, and the like. Liquid polymer compositions having polymeric backbone derived from polymerized units of a major amount of at least one vinylidene monomer listed in (a) to (d) with a minor amount of at least one comonomer listed in (e) to (k) are within the scope of this invention.

Examples of useful interpolymerized polymeric backbones of carbon-carbon linkages include polyethylene, polyisobutylene, polyisoprene, polybutadiene, poly(vinyl ethyl ether), as well as polymers of butadiene and acrylonitrile; butadiene and styrene; butadiene, acrylonitrile, and acrylic acid; vinyl acetate and isoprene; and vinyl acetate and chloroprene.

The most preferred liquid amine-terminated polymers are the amine-terminated liquid polymers having polymeric backbones comprised of carbon-carbon linkages derived from interpolymerized units of from about 50% to about 99.6% by weight of a diene such as isoprene or butadiene, and up to about 40% by weight of a vinyl nitrile such as acrylonitrile or a vinyl aromatic such as styrene, and up to 10% by weight of a vinyl acid such as acrylic acid, and having an amine content of from about 0.4% to about 10% by weight of the amine groups, all weights based upon the total weight of the polymer. These polymers have an average molecular weight of from about 1000 to about 5000, and a viscosity of from about 1000 to about 500,000 centipoises (measured at 27° C. using a Brookfield RVT viscometer with spindle no. 7 at 20 rpm).

Another essential ingredient in the composition of this invention is the solvent. The solvent requires the unusual property of being both water and organic soluble and having a relatively high boiling point of greater than about 100° C. Examples of solvents having the above described properties include the glycol ethers such as 1-methoxy-2-methyl ethanol, 2-propoxyethanol and 2-butoxyethanol which is commercially sold under the trademark butyl CELLOSOLVE.

The solvent is used in the composition at a level of at least 25 parts by weight based on 100 parts by weight of the polymer. When less than 25 parts of solvent is used with 100 parts by weight of polymer, the product composition is typically unstable and exhibits two phases. More preferably, the solvent is used in the range of about 50 to about 500 parts by weight based on 100 parts by weight of the polymer. The upper amount of solvent used is limited basically by the practical feasibility of the process. Excellent compositions were obtained when employing about 100 parts by weight of the solvent per 100 parts by weight of the amine-containing liquid polymer.

The third essential ingredient of the composition is an organic acid which has a pka value of less than 5. The preferred acids are short chain organic acids represented by the formula

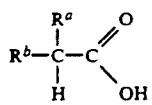

where $R^a$ is a straight or branched chain alkyl group containing from about 1 to about 9 carbon atoms, and $R^b$ is hydrogen, a hydroxyl group or a halogen. The most preferred organic acids are those of the above formula wherein $R^b$ is a hydroxyl group. Excellent results were obtained when the organic acid used was lactic acid.

The amount of organic acid employed is determined by the stoichiometry relationship of the acid per 1.0 amine equivalent. The amine equivalent weight (AEW) of the polymer is defined as 100 divided by the equivalents per hundred rubber of the amine-containing polymer. The amine-containing polymer can be solubilized using as low as about 0.8 carboxyl equivalents of organic acid per 1.0 amine equivalent. However, better dispersion is obtained at a level of about 1.0 carboxyl equivalent of organic acid per 1.0 amine equivalent, although up to a 20% excess can be readily employed without problems. The upper level of organic acid used is basically limited by feasibility and cost.

Water is the fourth essential ingredient in the composition. The water used can be distilled water, demineralized water, or regular tap water. The amount of water used in the solution is in the range of from about 50 parts to about 750 parts by weight per 100 parts by weight of the polymer. More preferably, the amount of water employed is from about 200 parts to about 600 parts of water per 100 parts of the polymer. Excellent results were obtained using about 500 parts by weight of water per 100 parts by weight of amine-containing liquid polymer.

The composition of the water-dispersed, amine-containing polymer is readily prepared by first dissolving the polymer in the solvent. This can be readily done at ambient temperature or with mild heating in a vessel. The dissolution of the polymer in the organic solvent is enhanced by mild agitation with, for example, a propeller type mixer operating at about 50 to about 300 rpm. Thereafter, the organic acid is added to the solvent solution of the polymer. Finally, the water is added slowly with mild agitation to yield a stable suspension of the liquid polymer in the water. No soap is used to prepare the water-dispersed compositions.

The compositions of the invention containing the water-dispersed amine-containing polymer can be readily used as a component in castable elastomeric systems, as an impact modifier for water-borne epoxy and polyester resins and coatings, and other applications.

The following examples illustrate the invention described herein. The examples are not to be construed as limiting in any way the scope of the invention disclosed herein.

EXAMPLE 1

A series of experiments were run using an amine-terminated liquid polymer commercially available from the B. F. Goodrich Company and marketed as Hycar ® ATBN 1300×16. The polymer contains about 16% by weight of acrylonitrile, has a Brookfield viscosity of 200,000 cps at 27° C. (81° F.), and has an amine equivalent weight of about 900. The lactic acid used in the example has a carboxyl equivalent weight of 90. The components used in the recipes below are shown in parts by weight.

|  | 1 | 2 | 3 | 4 |
|---|---|---|---|---|
| ATBN (1300 × 16) | 20 | 20 | 20 | 20 |
| Butyl Cellosolve | 20 | 10 | — | 20 |
| Lactic Acid (85% in water) | 3 | 3 | 3 | — |
| Water | 100 | 100 | 100 | 100 |
| Appearance | Translucent and Stable | Opaque and Stable | Stiff Emulsion | Two Phases |

The compositions were prepared by dissolving the ATBN liquid polymer in the butyl CELLOSOLVE at a temperature of about 25° C. followed by addition of the lactic acid. Water was then slowly added to the compositions while agitating the mixture at 50 to 300 rpm using an air stirrer with a marine blade. The first recipe exemplifies a preferred composition of the invention wherein a stable, translucent composition was prepared. In the second recipe, the use of less solvent (at 50 parts by weight based on 100 parts of liquid polymer) resulted in an opaque but still stable composition. Recipes 3 and 4 demonstrate the criticality of using the solvent and the organic acid, respectively, in the compositions. In both cases, the absence of one of the essential ingredients resulted in a non-stable composition.

EXAMPLE 2

The above experiment was repeated using other amine-terminated liquid polymers. The polymers are described as follows: AT-RLP-1 has a polybutadiene backbone, a Brookfield viscosity of 127,000 cps. at 27° C., and an amine equivalent weight of 1050; AT-RLP-2 has a backbone of interpolymerized butadiene and acrylonitrile (about 10% by weight), a viscosity of 180,000 cps., and an amine equivalent weight of 1200; and AT-RLP-3 has a backbone of interpolymerized butadiene, acrylonitrile (about 16% by weight), and acrylic acid (about 1.7% by weight) which carboxyl groups were converted to amine groups using the teachings of U.S. Pat. No. 4,133,957, a viscosity of 460,000 cps, and an amine equivalent of about 800. The components used in the recipes below are shown in parts by weight.

|  | 1 | 2 | 3 |
|---|---|---|---|
| AT-RLP-1 | 20 | — | — |
| AT-RLP-2 | — | 20 | — |
| AT-RLP-3 | — | — | 20 |
| Butyl Cellosolve | 20 | 20 | 2 |
| Lactic Acid | 3 | 3 | 3 |
| Water | 100 | 100 | 100 |

| | 1 | 2 | 3 |
|---|---|---|---|
| Appearance | Translucent and Stable | Translucent and Stable | Translucent and Stable |

EXAMPLE 3

The experiment in Example 2 above was essentially repeated using a mono-functional amine-terminated liquid polymer having a polymeric backbone comprised of interpolymerized butadiene and acrylonitrile (about 16% by weight). The amine-terminated polymer has a viscosity of 64,000 cps. and an amine equivalent weight of 2500. The recipe used was 10 parts by weight of polymer, 10 parts by weight of butyl CERLLOSOLVE, 1.5 parts by weight of lactic acid, and 50 parts by weight of water. A stable, translucent composition was readily prepared.

EXAMPLE 4

The above experiments were essentially repeated using an amine-containing liquid polymer having a polymeric backbone comprised of carbon-oxygen linkages. The amine-terminated polyether used is known as D-2000, which is commercially available from Texaco, Inc. through its Jefferson Chemical Co. subsidiary. The polymer is a polyoxypropyleneamine which has an average molecular weight of about 2000, a viscosity of about 265 centipoises at 25° C., and an amine equivalent weight of 1040. The recipe used was 20 parts by weight of D-2000, 20 parts by of butyl CELLOSOLVE, 3 parts by weight of lactic acid and 100 parts by weight of water. A stable, translucent composition was readily prepared.

EXAMPLE 5

The experiment in Example 4 above was repeated using a higher molecular weight amine-containing polymer having a polymeric backbone comprised of carbon-oxygen linkages. The amine-terminated polymer used is known as HC-1101, which is commercially available from the 3M Co. The polymer has an average molecular weight of 10,000, and an amine equivalent weight of 4610. The polymer is a low-melting solid at room temperature. Hence, the polymer was heated to about 5° C. and used in a liquid state. The recipe used was 10 parts by weight of HC-1101, 10 parts by weight of butyl CELLOSOLVE, 1.5 parts by weight of lactic acid and 50 parts by weight of water. A stable, translucent composition was readily prepared.

I claim:

1. A water-dispersed toughening agent composition for castable elastomeric systems, said composition comprising: (1) 100 parts by weight of an amine-containing liquid polymer having an average molecular weight of from about 1000 to about 10,000, (2) at least 25 parts by weight of an organic solvent which is both water and organic soluble and has a normal boiling point above about 100° C., (3) at least about 0.8 carboxyl equivalent of an organic acid for each 1.0 amine equivalent, said acid having a pk$_a$ value of less than about 5, and (4) from about 50 to about 750 parts by weight of water, wherein said amine-containing liquid polymer is represented by the following general formula:

$$Y_n\text{---}B\text{---}X$$

wherein Y is a univalent radical obtained by removing hydrogen from an amine group of an aliphatic, alicyclic, heterocyclic or aromatic amine which has at least two primary amine groups; n is an integer from 1 to abut 10; X is Y; and B is a polymeric backbone comprising carbon-carbon or carbon-oxygen linkages.

2. A composition of claim 1, wherein the amine-containing liquid polymer has a polymeric backbone comprised of interpolymerized units of from about 50 percent to about 99.6 percent by weight of a diene, up to about 40 percent by weight of a vinyl nitrile or vinyl aromatic, and up to about 10 percent by weight of a vinyl acid, and has an amine content of from about 0.4 percent to about 10 percent by weight, all weights based upon the weight of the polymer.

3. A composition of claim 1, wherein the solvent is present in from about 100 to about 500 parts by weight based on 100 parts by weight of the polymer.

4. A composition of claim 3, wherein the solvent is 2-butoxyethanol.

5. A composition of claim 1, wherein the organic acid is employed at about 1.0 carboxyl equivalent or organic acid for every 1.0 amine equivalent.

6. A composition of claim 1, wherein the organic acid is lactic acid.

* * * * *